United States Patent Office 3,352,358
Patented Nov. 14, 1967

3,352,358
WATERFLOOD EMPLOYING VISCOUS AQUEOUS SOLUTIONS
Sherrod A. Williams, Jr., Dallas, Tex., assignor to Mobil Oil Corporation, a corporation of New York
No Drawing. Filed May 3, 1965, Ser. No. 452,910
1 Claim. (Cl. 166—9)

ABSTRACT OF THE DISCLOSURE

This specification discloses a method of waterflooding to recover oil from a subterranean formation. The method comprises injecting a slug of viscous flooding water comprising water containing at least 0.1 percent by weight of polyvinyl alcohol sulfate. The polyvinyl alcohol sulfate molecule contains at least 50 monomer units and has a preferred degree of sulfation of 0.2 to 0.6. Preferably, a slug of from 0.01 to about 5 percent pore volume of fresh water is injected through the injection means and into the subterranean formation both ahead of and behind a slug of from 5 to 15 percent pore volume of viscous flooding water, and brine, or water containing electrolyte, is injected therebehind.

---

The present invention is broadly concerned with a secondary recovery operation for obtaining oil from a subterranean formation. The invention is more particularly directed to a secondary recovery operation wherein water is employed and wherein a water-thickening agent is utilized to increase the viscosity of the water so as to prevent fingering in the oil-containing formation.

The oil accumulated in subterranean formations is recovered or produced therefrom through wells drilled into the subterranean formations. A large amount of oil is left in the subterranean formations if produced only by primary depletion, i.e., by employing only initial formation energy to recover the oil. Supplemental operations, often referred to as secondary recovery operations, are used to improve the extent of recovery. In certain of these supplemental operations, a fluid is injected into a well, called an injection well, and passed into the formation. Oil is displaced within and is moved through the formation, and is produced from one or more other wells, called production wells, as the injected fluid passes from the injection well toward the production wells. In a particular recovery operation of this sort, water is employed as the injected fluid and the operation is referred to as a waterflood. The injected water is referred to as the flooding water, as distinguished from the in-situ, or connate, water.

While conventional waterflooding is effective in obtaining additional oil from oil-containing subterranean formations, it has a number of shortcomings. Foremost among these shortcomings is a tendency of flooding water to "finger" through an oil-containing formation and to bypass substantial portions thereof. By fingering is meant the developing of unstable bulges or stringers which advance toward the production wells more rapidly than the remainder of the flooding water. Furthermore, the water does not normally displace as much oil in the portions of the formation which it contacts as it theoretically is capable of doing.

It has been established that waterfloods perform less satisfactorily with viscous oils than with relatively nonviscous oils. The fingering and bypassing tendencies of the water are more or less directly related to the ratio of the viscosity of the oil to the viscosity of the floodwater. The viscosity of in-situ oils varies from as low as 1 or 2 centipoises to 1000 centipoises or higher. Water has a viscosity of about 1 centipoise.

The relationship between the mobility of the oil and the mobility of the flooding water in a particular formation is related to their respective viscosities according to the following equation:

$$\frac{M_o}{M_w} = \left(\frac{\mu_w}{\mu_o}\right)\left(\frac{K_o}{K_w}\right) \quad (1)$$

where $M_o$ is the mobility of the oil in the formation,
$M_w$ is the mobility of the flooding water in the formation,
$\mu_o$ is the viscosity of the oil,
$\mu_w$ is the viscosity of the flooding water,
$K_w$ is the relative permeability of the formation to the flooding water in the presence of the oil which remains after passage of the water, and
$K_o$ is the relative permeability of the formation to the oil in the presence of the connate water.

In a subterranean formation containing oil having a high viscosity, in order to achieve a mobility ratio of 1, i.e., where the flooding water and the oil move through the formation with equal facility, the viscosity of the flooding water must be increased. In the absence of severe differences in relative permeabilities $K_o$ and $K_w$, the mobilities $M_o$ and $M_w$ are inversely proportional to the viscosities $\mu_o$ and $\mu_w$, respectively.

Past suggestions for increasing the viscosity of flooding water have included incorporating water-soluble agents in the water. Materials that have been suggested for this purpose include a wide variety of naturally occurring gums, sugars, and polymers. While these materials are effective to an extent in increasing the viscosity of floodwater, they also are characterized by serious disadvantages. For example, some of the materials have a tendency to filter out and plug formations; some are relatively unstable and particularly subject to bacterial degradation; some are adsorbed onto the mineral surfaces; and some form insoluble precipitates with elements native to the in-situ formation, for example, calcium or magnesium.

In accordance with the invention, in the recovery of oil from an oil-containing subterranean formation wherein a flooding liquid is injected through an injection well and oil is produced through a production well, there is employed, as at least a portion of the flooding liquid, water incorporating at least 0.01 percent by weight of a water-soluble polyvinyl alcohol sulfate. As discussed in more detail hereinafter, the concentration of the polyvinyl alcohol sulfate employed is preferably high enough to restrict the mobility of water to a value no greater than that of the mobility of the oil in the formation.

The formula of the polyvinyl alcohol sulfate is as follows:

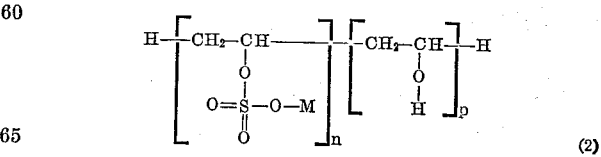

(2)

where

M is hydrogen, alkali metal, or ammonium ion, and $n+p$ has a value of at least 50.

For most subterranean formations, it is preferred to employ the alkali metal polyvinyl alcohol sulfate or the ammonium polyvinyl alcohol sulfate.

The alkali metal polyvinyl alcohol sulfate may be prepared by any suitable method, but a convenient manner of preparation is to react polyvinyl alcohol with a pyridine-sulfur trioxide complex in the presence of an ion-yielding material such as sodium chloride. This method of preparation is described in U.S. Patent 2,631,128 to Rufus V. Jones. As described therein, 1 mol of polyvinyl alcohol is reacted with 1 to 10 mols, preferably 2 to 6 mols, of sulfating agent selected from the group consisting of compounds of sulfur trioxide with pyridine, dioxane, dimethyl aniline, or $\beta, \beta'$-dichlorodiethylether; 0.5 to 1.5 mols, preferably 1 mol, of alkali metal halide per mol of sulfating agent; and 1 to 50 mols of a tertiary amine such as pyridine, picolines, other alkyl pyridines, and quinoline per mol of polyvinyl alcohol; at a temperature of 104° to 239° F., preferably 176° to 212° F., for a reaction time of 2 to 14 hours.

The acid form or the ammonium salt of the polyvinyl alcohol sulfate can be prepared from this alkali metal polyvinyl alcohol sulfate by ion-exchange processes.

The number of sulfate groups introduced into the polyvinyl alcohol molecule is variable and will depend upon the specific reaction conditions employed and can be varied to change suitably the properties of the polyvinyl alcohol sulfate. The average number $n$ of sulfated vinyl alcohol units divided by the total number of monomer units in the polyvinyl alcohol molecule, i.e., $n/n+p$, is expressed as the degree of sulfation. In the practice of the invention, it is preferred to employ a polyvinyl alcohol sulfate having a degree of sulfation within the range of 0.2 to 0.6, although higher or lower amounts, e.g., 0.1 to 1.0, can be used when desired.

For example, 1 mol of pyridine sulfur trioxide complex, 1 mol of polyvinyl alcohol, 1 mol of sodium chloride, and 3.2 mols of pyridine were heated together at about 104° F. for eight hours. Following removal of pyridine, the product was washed with methanol, pulverized in the presence of methanol, dispersed in water, and filtered. The filtrate was poured into a large volume of methanol and the resulting precipitate separated by centrifuging and then extracted with methanol until free of chloride ions. The resulting 67 grams of polyvinyl alcohol sulfate had a sulfur content of 16.34 percent and a sodium content of 13.8 percent, representing a degree of sulfation of 0.46.

The amount of polyvinyl alcohol sulfate employed in the flooding water can be varied considerably, as even small amounts are effective, although to a correspondingly small degree. For example, as low as 0.01 percent by weight of polyvinyl alcohol sulfate may be employed in the flooding water. However, as noted hereinbefore, it is preferred to employ an amount of polyvinyl alcohol sulfate sufficient to increase the viscosity of the flooding water to a value such that the flooding water is no more mobile than is the oil in the subterranean formation. As a general rule, the amount of polyvinyl alcohol sulfate employed will be in excess of 0.05 percent by weight and less than 0.5 percent by weight. At concentrations of polyvinyl alcohol sulfate above 0.5 percent by weight, the flooding liquid becomes very viscous and decreases the rate of injection of the flooding water into the subterranean formation. The upper limit of the concentration of polyvinyl alcohol sulfate may be determined empirically for each subterranean formation in view of the decrease in the rate of injection which can be tolerated. For extremely permeable formations or formations having extremely permeable strata therein, it may be desirable to employ fairly high concentrations, e.g., above 0.5 percent by weight in at least a portion of the flooding water.

The viscous flooding water is injected in a slug of from about 5 percent to about 15 percent of the pore volume to be swept between the injection and the production wells. Such a slug of viscous flooding water achieves a mobility ratio of at least 1. When a mobility ratio of at least 1 is established, a condition of stability exists such that the oil moves through the subterranean formation at least as readily as the water. When flooding water displaces oil from a subterranean formation under such a condition of stability, fingering and premature breakthrough of flooding water at the production well are significantly alleviated, compared to an unstable flooding condition.

The slug of viscous flooding liquid may be driven to the production well by the injection of an aqueous driving liquid therebehind. By aqueous driving liquid is meant water, oil field brines, or any of the commonly available dilute aqueous solutions which are usually employed.

The thickened flooding water containing polyvinyl alcohol sulfate forms a stable solution which is resistant to attack by most strains of bacteria. Further, the polyvinyl alcohol sulfate does not form an insoluble precipitate even in formations containing limestone or other minerals formed of elements such as calcium or magnesium.

The method of the invention is improved by the injection of a slug of from 0.01 to 5 percent pore volume or more of fresh, or nonsaline, water ahead of the viscous aqueous flooding liquid. This minimizes any effects of adverse electrolytes which may be present in the subterranean fluids. Further, when the viscous flooding water is to be followed by an oil field brine or solution containing a strong electrolyte, the method of the invention is improved by injection of a slug of from 0.01 to 5 percent pore volume of fresh water between the viscous flooding water and the brine which is to be employed as the driving liquid.

By employing the polyvinyl alcohol sulfates in at least a portion of the aqueous flooding liquid, the increased viscosity of the flooding water achieves a stable floodfront in which the oil is driven through the formation in a manner analogous to the movement of a piston. In this manner, the tendency of the flooding water to finger through the bank of driven oil is prevented; and an improved areal and vertical sweep efficiency results. The driving aqueous liquid therebehind miscibly displaces the viscous flooding water, driving the equally mobile oil before it. Further, the polyvinyl alcohol sulfates are more disassociated and have a more negative charge than most of the additives of the prior art. Therefore, they are adsorbed less onto the mineral surfaces in the subterranean formation. Still further, a wide range of viscosities, e.g., from 10 to 1000 centipoises or more, is obtainable by employing the polyvinyl alcohol sulfate.

Having thus described the invention, it will be understood that such description has been given by way of illustration and example and not by way of limitation, reference for the latter purpose being had to the appended claim.

What is claimed is:

A method for the recovery of oil from an oil-containing subterranean formation having an injection means comprising at least one injection well and a production means comprising at least one production well completed therein, comprising:

(a) injecting through said injection means and into said subterranean formation a slug of from 0.01 to about 5 percent pore volume of fresh water through said injection means and into said subterranean formation;

(b) injecting therebehind a slug of from 5 to 15 percent pore volume of viscous flooding water comprising water having incorporated therein from 0.05 to 0.5 percent by weight of a water-soluble polyvinyl alcohol sulfate through said injection means into said subterranean formation; and (c) injecting therebehind an aqueous driving liquid comprising a slug of from 0.01 to about 5 percent pore volume of fresh water followed by an electrolyte-containing water, whereby oil is displaced within and is moved through said subterranean formation, and is produced to the surface through said production means.

References Cited

UNITED STATES PATENTS

| | | | |
|---|---|---|---|
| 2,631,128 | 3/1953 | Jones | 252—8.5 |
| 2,792,894 | 5/1957 | Graham et al. | |
| 2,800,962 | 7/1957 | Garst. | |
| 2,827,964 | 3/1958 | Sandiford | 166—9 |
| 3,076,504 | 2/1963 | Meadors et al. | 166—9 |

CHARLES E. O'CONNELL, *Primary Examiner.*

JAMES A. LEPPINK, *Assistant Examiner.*